(12) United States Patent
Guttau et al.

(10) Patent No.: US 8,501,013 B2
(45) Date of Patent: Aug. 6, 2013

(54) RECIRCULATION SHOWER FOR AIRCRAFT (75) Inventors: Simone Guttau, Buxtehude (DE);
Christiane Lindauer, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 598 days.

(21) Appl. No.: 12/726,104

(22) Filed: Mar. 17, 2010

(65) Prior Publication Data

US 2010/0237021 A1    Sep. 23, 2010

Related U.S. Application Data (60) Provisional application No. 61/160,792, filed on Mar. 17, 2009.

(30) Foreign Application Priority Data

Mar. 17, 2009  (DE) .................. 10 2009 013 554

(51) Int. Cl.
*C02F 1/00* (2006.01)
(52) U.S. Cl.
USPC ........... 210/741; 210/136; 210/196; 210/411; 210/418
(58) Field of Classification Search
USPC .................. 210/741, 136, 196, 411, 418
See application file for complete search history.

(56) References Cited

U.S. PATENT DOCUMENTS

| 4,828,709 A | * | 5/1989 | Houser et al. ............. 210/669 |
| 4,871,452 A |   | 10/1989 | Kohler et al. |
| 2007/0138092 A1 | * | 6/2007 | Smith et al. .............. 210/636 |
| 2009/0294356 A1 | * | 12/2009 | Beggs ..................... 210/618 |

FOREIGN PATENT DOCUMENTS

| DE | 3715759 A1 |   | 12/1988 |
| DE | 4302319 A1 | * | 11/1993 |
| JP | 2006205127 A | * | 8/2006 |
| WO | WO 2006131743 A1 | * | 12/2006 |

OTHER PUBLICATIONS

Complete Machine Translation of DE 4302319 A1.*
Complete Machine Translation of JP 2006205127 A.*

* cited by examiner

*Primary Examiner* — Duane Smith
*Assistant Examiner* — Paul J Durand
(74) *Attorney, Agent, or Firm* — Ingrassia Fisher & Lorenz P.C.

(57) ABSTRACT

A system is provided for water purification for a recirculation shower in a transport with a filtration unit, a first backwash line and a second backwash line. The filtration unit is designed to filter used shower water. The first backwash line and the second backwash line are designed to clean the filtration unit with a backwashing. The first backwash line is designed to convey backwash water to the filtration unit. The second backwash line is designed to discharge backwash water from the filtration unit.

19 Claims, 4 Drawing Sheets

RECIRCULATION SHOWER FOR AIRCRAFT

CROSS-REFERENCE TO RELATED APPLICATIONS

This application claims the benefit of the filing date of U.S. Provisional Patent Application No. 61/160,792 filed Mar. 17, 2009 and of German Patent Application No. 102009013554.5 filed Mar. 17, 2009, the disclosures of which are hereby incorporated herein by reference.

TECHNICAL FIELD

The invention relates to water purification for a shower in a means of transport. In particular, the invention relates to a system for water purification for a recirculation shower in a means of transport. Furthermore, the invention relates to a recirculation shower with a system for water purification for a recirculation shower, to a means of transport comprising a recirculation shower and to a method for water purification for a recirculation shower in a means of transport.

BACKGROUND

Passenger comfort on board aircraft is of increasing importance for airlines with respect to their customers. Airlines increasingly demand options for offering facilities that otherwise are more likely to be encountered in hotels. In particular on a long-haul flight it is often considered to be comfortable and important to make it possible for customers to enjoy a refreshing shower. Since additional weight, and thus taking along freshwater, increases the operating costs of the aircraft, frugal use of freshwater may be decisive. In addition, freshwater may have to be prevented from becoming contaminated by the shower system.

From DE 43 02 319 A1 a method and an arrangement for the treatment of waste water, in particular in aircraft, is known. DE 37 15 759 A1 discloses an arrangement for supplying and treating water, in particular on board an aircraft, which arrangement comprises water removal points as well as a drinking water tank and a waste water tank.

SUMMARY

Stated are a system for water purification for a recirculation shower in a means of transport; a recirculation shower with the system; a means of transport with the recirculation shower; and a method for water purification for a recirculation shower in a means of transport.

According to an exemplary embodiment of the invention, a system for water purification for a recirculation shower in a means of transport with a filtration unit, a first backwash line and a second backwash line is stated. The filtration unit is designed to filter used shower water. The first backwash line and the second backwash line are designed to clean the filtration unit by means of backwashing. The first backwash line is designed to convey backwash water to the filtration unit. The second backwash line is designed to discharge backwash water from the filtration unit. This may provide for a weight-saving shower system in a means of transport.

Such a system for water purification may make it possible to considerably reduce water consumption for showering in the recirculation shower. In this arrangement a predefined quantity of freshwater is stored and heated so that a showering process can be started. As an alternative, or in addition, it may also be possible to provide an instantaneous heater, an arrangement which obviates the need to provide a heatable water tank.

After the water has first been used in the showering process, the water is purified and processed. By means of this continuous process it may be possible to let the water flow through the shower head several times, thus making it possible to shower for an indefinite time. Thus, water-saving showering as a result of recirculation and simultaneous purification of the water during the showering process can take place. Cleaning of the filtration unit by backwashing with the use of the first backwashing line and the second backwashing line supports steady operation and maintains the functionality of water-saving showering. In this arrangement the showering operation may take place without any additional supply of freshwater.

The means of transport is an aircraft, for example an aero plane, a helicopter or an airship, or a rail vehicle, a water craft or a road vehicle.

According to a further exemplary embodiment of the invention, the filtration unit is designed as a microfiltration unit or as an ultrafiltration unit. The microfiltration unit may make it possible to separate dirt particles of a size between approximately 0.5 and approximately 0.1 µm from the shower water. Ultrafiltration may make it possible to filter out particles of a size between approximately 0.1 and approximately 0.01 µm. In this arrangement the transitions between the two methods are fluid. Shower water can be supplied to an ultrafiltration unit or microfiltration unit at a similarly high constant uniform pressure of the used shower water. It is thus not necessary for the ultrafiltration unit and the microfiltration unit to be operated at different pressures for both filtration units to function.

According to a further exemplary embodiment of the invention, the system further comprises a freshwater feed unit, wherein the freshwater feed unit is provided for feeding freshwater to supply the recirculation shower with water, and for feeding backwash water for backwashing.

Furthermore, according to an exemplary embodiment of the invention, a control unit is provided. The control unit is designed for controlling and regulating the water supply through the freshwater feed unit.

According to a further exemplary embodiment of the invention, the control unit is designed to control or regulate the water supply through the freshwater feed unit based on the shower water flow through the filtration unit.

Such a system may make it possible, in the case of insufficient throughput through the closed recirculation shower cycle, in which used shower water is purified and fed back into the shower cycle as the only available shower water, or in the case of the shower-water flow dropping below a predetermined minimum that can be detected by the control unit in conjunction with a corresponding detector, for the freshwater feed unit to feed the lacking quantity of shower water into the system in order to make it possible to shower at the same pressure.

According to a further exemplary embodiment of the invention, the control unit is designed as a control valve or comprises a control valve.

According to a further exemplary embodiment of the invention, the system comprises a detection unit, wherein the detection unit is designed to determine a malfunction in the filtration unit, wherein the detection unit is designed to trigger backwashing in the case of a malfunction of the filtration unit when a corresponding malfunction has been detected.

Such a system with a detection unit may make it possible for a determined degree of dirt build-up in the filtration unit, for example in the form of a layer on a membrane of the filtration unit, to be detected by the detection unit with the use of physical or chemical methods, and if the value is above or below a particular threshold value of dirt build-up, to carry out backwashing to clean the filtration unit based on a corresponding signal from the detection unit to the first backwash line. Such a signal can, for example, initiate opening a backwash valve, which ensures water supply to the first backwash line, thus allowing backwashing. Physical methods for determining a malfunction of the filtration unit by the detection unit can, for example, be optical methods or methods for determining the flow speed or flow quantity of the used shower water on the membranes of the filtration unit.

According to a further exemplary embodiment of the invention, the detection unit is designed as a pressure sensor or comprises a pressure sensor. The pressure sensor is designed to determine the differential pressure from a first pressure upstream of the filtration unit and a second pressure downstream of the filtration unit. The pressure sensor is designed to trigger backwashing when a threshold value of the differential pressure has been reached or when there is a loss of volume flow in the filtration unit.

According to a further exemplary embodiment of the invention, the system comprises a disinfection unit and a backwash valve. The disinfection unit is designed to disinfect the shower water after filtration of the shower water through the filtration unit. The disinfection unit is designed to hold a disinfectant by way of the backwash valve that can be designed as a three-way valve. The disinfection unit is designed to disinfect the shower water by means of the disinfectant. The backwash valve is designed to set a backwash position during backwashing.

According to a further exemplary embodiment of the invention, the disinfection unit is designed to disinfect the shower water by means of physical methods in the flow-through method over a defined period of time.

Such a system may make it possible to clean the used shower water, for example by means of UV disinfection, filtration or thermal methods, in such a way that the shower water can be used without hesitation for a new showering process or for the ongoing showering process.

According to a further exemplary embodiment of the invention, the system comprises a pre-filtration unit, a storage tank unit and an after-treatment unit, wherein the pre-filtration unit is designed for first filtration of the shower water of the recirculation shower. The storage tank unit is designed to bring about a particular temperature of the shower water after first filtration, wherein the after-treatment unit is designed for after-treatment of the shower water. The storage tank is designed to hold a cleaning agent, wherein the storage tank is designed for backwashing the system by means of the cleaning agent.

Such a system with a pre-filtration unit may make it possible, for example, for lint and hair that get into the drain as a result of the showering process to be separated in that location and to settle on the filter material. Among other things this prevents dirt build-up in the storage tank unit into which the water flows after pre-treatment. When required, the material deposited on the pre-filtration unit can also be removed by suction by way of a connection, for example to a vacuum toilet system, so that this may not require any regular maintenance.

According to a further exemplary embodiment of the invention, the system is designed to bring about a constant temperature of the storage tank contents by means of a heater unit so as to prevent excessive temperature fluctuations of the shower water within the shower water circuit, and to bring the shower water to a desired temperature in the storage tank.

According to a further exemplary embodiment of the invention, the after-treatment unit of the system, the disinfection unit and the microfiltration unit of the system are designed so as to be removable for cleaning, wherein the removed units can, for example, be purified by a consumer by means of a treatment cartridge that comprises cleaning agents, for example after every showering process.

According to a further exemplary embodiment of the invention, the system comprises a nonreturn valve that may be implemented as an air bridge which may prevent different water flows from meeting each other, i.e., it may prevent bacteria from one water flow from being transferred to another water flow; a freshwater shut-off valve; and a shut-off valve, wherein the nonreturn valve and the freshwater shut-off valve are designed to prevent contamination of the freshwater feed unit, and wherein the shut-off valve is designed to shut off the infeed of freshwater into the system when backwashing is initiated.

According to a further exemplary embodiment of the invention, the system comprises a pump, a first valve, a second valve and a air check valve with the function of separating cabin pressure conditions from exterior pressure conditions, wherein the pump is designed for pumping the shower water from the storage tank unit by way of a first valve to the filtration unit, wherein the shower water is fed by way of the second valve from the filtration unit to the after-treatment unit, wherein the after-treatment unit is designed for after-treatment of the shower water, for example by means of chemical methods or physical adsorption methods, and wherein the air check valve is designed to drain the backwash water to the exterior atmosphere of the means of transport or to a container of the means of transport after backwashing.

Such a system may make it possible, for example, for the after-treatment unit, after filtration of floating particles, to chemically, for example by treatment with active charcoal, treat the used shower water in that, for example, contaminants are bound, and subsequently, in a disinfection unit, germs that may be present in the used shower water can be killed, for example with the addition of chlorine or ozone.

According to a further exemplary embodiment of the invention, the filtration unit is designed as a membrane unit, wherein the membrane unit comprises several membrane modules that are designed for a parallel connection, a series connection, or a combination of parallel connection and series connection.

In such a system the flow through the membrane module may take place in the cross-flow method or in the dead-end method. In the cross-flow method the used shower water is permanently fed past the membrane, horizontally to the membrane surface, for example by means of a circulation pump. Part of the water is pushed through the membrane, while another part (large-diameter particles that cannot penetrate the membrane) is discharged as a concentrate, for example to the storage tank unit. In the dead-end method the water is pushed through the membrane vertically to the membrane surface, as in a dead end. Dirt particles collect on the surface and in the capillaries of the membrane. The material of the membrane may either be organic or inorganic. The arrangement of the membrane in the module may be as a hose or as a flat membrane.

According to a further exemplary embodiment of the invention, the after-treatment unit and the disinfection unit may be designed so as to be in one module unit.

According to a further exemplary embodiment of the invention, the disinfection unit may be fed by means of an external disinfectant addition, wherein consequently the water, free of any solids, organic impurities and, following inhibition of bacteria and viruses, may be made available to a user for showering.

According to a further exemplary embodiment of the invention, backwashing the filtration unit may take place after a defined number of showering processes or showering cycles. Such a system may make it possible to operate backwashing in a time-controlled or use-controlled manner. In this arrangement after a particular number of uses a backwash process is triggered, wherein the first and the second valve as well as the shut-off valve can be closed, and the backwash valve can be moved to the backwash position. In this process the water can impinge the membrane either in short pulses or evenly for a particular period of time so as to make it possible to remove residues on a membrane unit of the filtration unit. The backwash water may be placed in the storage tank unit by way of the second backwash line, and after completion of the procedure can be drained by way of the air check valve.

According to a further exemplary embodiment of the invention, in order to optimize the service life of the membrane in the system, by means of backwashing, the entire system can be cleaned and rinsed. In this arrangement this method can be implemented after each consumer or after a defined period of time. In a showering process freshwater can be fed to the circuit by way of the freshwater shut-off valve, the nonreturn valve and the shut-off valve, wherein in the storage tank unit the water is collected and a cleaning agent is added. Subsequently, analogous to a showering process, the water is circulated in order to clean and subsequently rinses the pipelines and the devices present in the system.

According to a further exemplary embodiment of the invention, the system can be of any size so as to make it possible to feed water to several shower cabins comprising recirculation showers.

Such a system may provide an advantage in that a shower system can be installed in a compact space, and shower regions that are nearby can be operated jointly. In this arrangement all the components for the system can, for example, be integrated in an aircraft and can be adapted to all the electrical and mechanical interfaces of the aircraft, as well as to the requirements of the aircraft.

According to a further exemplary embodiment of the invention, the system comprises a shower head, a shower tray, and a heater unit, wherein the heater unit is designed to bring about a desired shower water temperature, wherein the shower head is designed to deliver shower water, and wherein the shower tray is designed to take up the used shower water.

According to a further exemplary embodiment of the invention, the system comprises a vacuum suction device, wherein the vacuum suction device is designed to clean the pre-filtration unit.

According to a further exemplary embodiment of the invention, the system is designed to supply two or several shower units, wherein each shower unit can be cut off from the system by means of a shut-off valve, and wherein the system comprises a heating unit, a shower head, a shower tray, a pre-filtration device and a vacuum suction device.

According to a further exemplary embodiment of the invention, the system comprises a filtration unit that can be cleaned by means of a backwash method, and the system comprises a water-saving shower head to minimize the required quantity of water and thus to minimize the additional weight requirement in the aircraft.

According to a further exemplary embodiment of the invention, the system comprises a filtration unit that may be designed as an exchangeable unit, and that may be changed after each showering process.

According to a further exemplary embodiment of the invention, a combination of membrane methods of the filtration unit of the system with other methods for water purification in a passenger aircraft is stated.

According to a further exemplary embodiment of the invention, a recirculation shower with a system according to one of the preceding exemplary embodiments for a means of transport is stated, wherein the system comprises a refrigeration unit or a temperature control unit that is designed to bring about a particular temperature of the used shower water prior to filtering the shower water by means of the filtration unit.

According to a further exemplary embodiment of the invention, a means of transport (e.g., an aircraft) with a monument that comprises a recirculation shower according to one of the preceding exemplary embodiments is stated.

According to a further exemplary embodiment of the invention, a means of transport with a monument that comprises a recirculation shower with several systems according to one of the preceding exemplary embodiments or several purification methods is stated.

According to a further exemplary embodiment of the invention, a method for water purification for a recirculation shower in a means of transport is stated with a first step for filtering used shower water through a filtration unit; a second step for conveying the backwash water to the filtration unit through a first backwash line; a third step for cleaning the filtration unit by backwashing through the first backwash line, and through a second backwash line; as well as a last step for discharging the backwash water from the filtration unit through the second backwash line.

According to a further exemplary embodiment of the invention, the method further comprises feeding freshwater for the supply of water to the recirculation shower, and feeding backwash water for backwashing through a freshwater feed unit, as well as the step of controlling or regulating the water supply through the freshwater feed unit by means of the control unit.

According to a further exemplary embodiment of the invention, the method further comprises determining a malfunction of the filtration unit by means of a detection unit, as well as the step of triggering backwashing based on the malfunction of the filtration unit by means of the detection unit.

According to a further exemplary embodiment of the invention, a further method for water purification for a recirculation shower in a means of transport comprising the following steps is stated: first filtering of the shower water of the recirculation shower by means of a pre-filtration unit; bringing about a determined temperature of the shower water after first filtering by means of a storage tank unit; conveying the shower water from the storage tank unit by way of a first valve to a filtration unit by means of a pump; second filtering of the shower water through a filtration unit; conveying the shower water by way of a second valve from the filtration unit to an after-treatment unit; after-treatment of the shower water by means of the after-treatment unit; carrying out backwashing for cleaning the filtration unit; feeding freshwater to the system and feeding backwash water for backwashing by means of a freshwater feed unit; blocking the freshwater feed to the system if backwashing has been triggered, by means of a shut-off valve; setting a backwash position during backwashing by means of a backwash valve; conveying the backwash water conveyed through the backwash valve to the filtration unit by means of a first backwash line; conveying the backwash water from the filtration unit to the storage tank by means of a second backwash line; draining the backwash water to the exterior atmosphere of the means of transport or to a container of the means of transport after backwashing, by means of an air check valve; preventing contamination of the freshwater feed unit by means of a nonreturn valve and a freshwater shut-off valve; cleaning the pre-filtration unit by means of vacuum suction; bringing about a desired shower water temperature by means of a heating unit; delivering the shower water through a shower head; receiving the used shower water by means of a shower tray; and backwashing the filtration unit after a determined number of showering processes.

The individual characteristics of the various exemplary embodiments may also be combined, as a result of which advantageous effects may arise which exceed the sum of the individual effects even if these are not expressly described.

It should, in particular, be noted that the characteristics described below with reference to the system may also be implemented in the recirculation shower, in the means of transport and in the method, and vice versa.

BRIEF DESCRIPTION OF THE DRAWINGS

The present invention will hereinafter be described in conjunction with the following drawing figures, wherein like numerals denote like elements.

DETAILED DESCRIPTION

Below, exemplary embodiments of the invention are described with reference to the enclosed drawings. The illustrations in the figures are diagrammatic and not to scale. In the following description of the figures the same reference characters are used for identical or similar elements.

Figure 1:
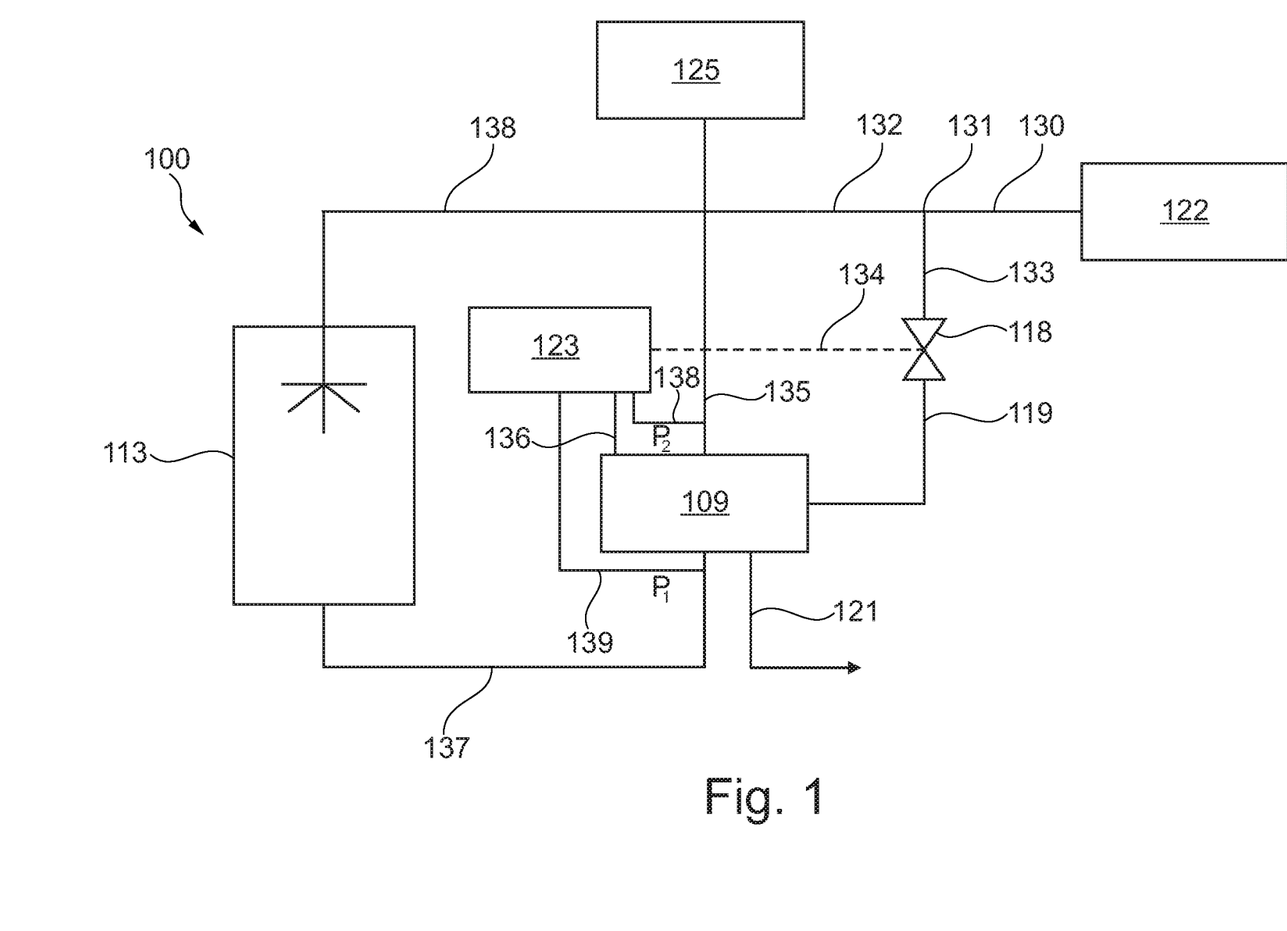
FIG. 1 shows a diagrammatic view of a system for water purification for a recirculation shower in a means of transport according to an exemplary embodiment of the invention.

FIG. 1 shows a system 100 for water purification for a recirculation shower 113 in a means of transport with a filtration unit 109 which by way of a line 137 is connected to an outflow of the recirculation shower 113, as well as with a first backwash line 119 which is supplied with water by means of a freshwater feed unit 122 by way of a line 130 and a branch 131, as well as by way of a further line 133 and a backwash valve 118. In this arrangement the first backwash line 119 is connected to the outlet of the filtration unit 109. The first backwash line 119 is designed for cleaning the filtration unit 109 by means of backwashing.

A second backwash line 121 is connected to the inlet of the filtration unit 109 and is designed to discharge backwash water from the filtration unit, for example to an exterior region of the means of transport. The filtration unit 109 is designed to filter used shower water that is fed by way of the line 137 from the recirculation shower 113 to the filtration unit 109. A detection unit 123 is connected to the filtration unit 109 by way of the line 136 and can be designed as a pressure sensor 123 to determine a malfunction in the filtration unit 109, wherein the detection unit 123 is designed to determine the differential pressure between a first pressure P1 upstream of the filtration unit 109, and a second pressure P2 downstream of the filtration unit 109. Determining the first pressure P1 takes place by way of a line 139 that connects the detection unit 123 to the supply line 137 upstream of the filtration unit 109. Detection of the second pressure P2 is made possible by means of a connection 138 of the detection unit 123 to a line 135 which forwards the filtered used shower water from the filtration unit 109 to a connected control unit 125.

The detection unit 123 is designed to trigger backwashing when a threshold value of the differential pressure has been reached or when there is a volume flow loss in the filtration unit 109, and regulates the water supply of the first backwash line 119 by means of activating a backwash valve 118 that is connected, by way of a line 134 (shown as a dashed line), to the detection unit 123. The detection unit can, for example, issue a signal to the backwash valve 118 by way of the line 134 that signal causes opening of the backwash valve 118 and thus the water supply to the first backwash line 119.

The freshwater feed unit 122 is connected to a connected control unit 125 by way of a line 130, a node 131 and a further line 132, which control unit 125 regulates feed-in of freshwater for the supply of freshwater to the recirculation shower 113 by way of a line 138 that leads from the connected control unit 125 to the recirculation shower 113. The freshwater feed unit 122 is furthermore designed to feed backwash water for backwashing by way of a line 130 to a node 131, a line 133 that connects the freshwater feed unit 122 to a backwash valve 118, and the first backwash line 119, which is connected to the filtration unit 109.

Figure 2:
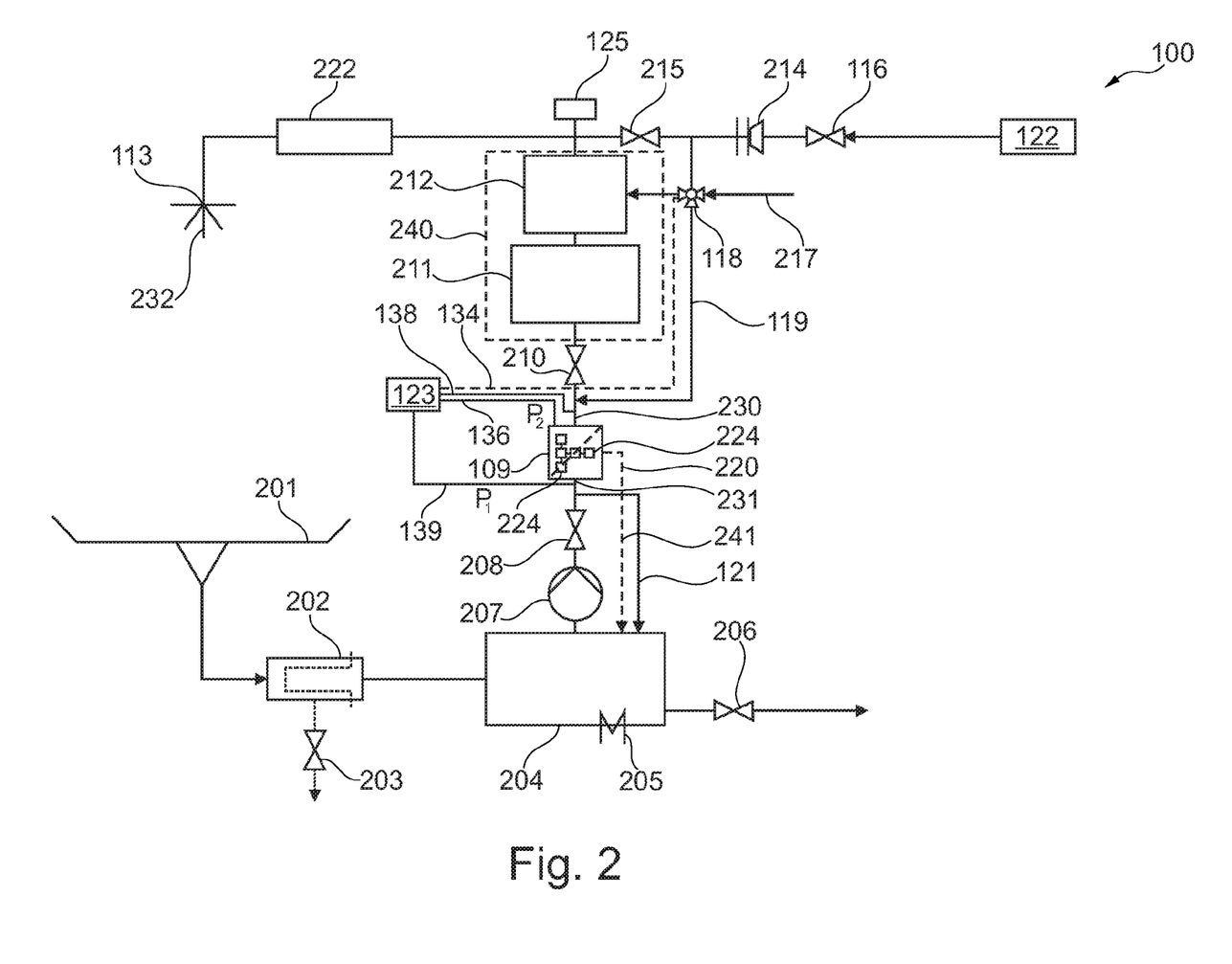
FIG. 2 shows a diagrammatic view of a system for water purification for a recirculation shower in a means of transport according to a further exemplary embodiment of the invention.

FIG. 2 shows a system 100 for water purification for a recirculation shower 113 in a means of transport with the corresponding elements of the system 100 of FIG. 1. The system 100 according to FIG. 2 comprises a freshwater feed unit 122 that feeds freshwater by way of a freshwater shut-off valve 116 and by way of a nonreturn valve 214, which protects against the backflow of contaminated water to the freshwater system, to a shower circuit or to the system 100. In this arrangement, the freshwater, downstream of the nonreturn valve 214, flows through a shut-off valve 215, which is closed during backwashing of the system, and, by way of a connected control unit 125, which is designed to control or regulate the water supply through the freshwater feed unit 122, to a heater unit 222 which preheats the water to a desired shower temperature. Subsequently, the pre-heated water reaches the recirculation shower 113 and, after issuing from the shower head 232, a shower tray 201.

The water flowing from the shower tray 201 is pre-treated in a pre-filtration unit 202. Lint and hair that reaches the drain as a result of the showering process are separated at that location and are deposited on the filter material. Among other things this prevents dirt build-up on the storage tank unit 204 that is connected to the pre-filtration unit 202. Following pre-filtration the used shower water flows into the storage tank unit 204. The material deposited on the pre-filtration unit 202 is removed by suction, whenever required, by way of a connection, for example to a vacuum toilet system of the means of transport, upstream of which a valve 203 is arranged, so that there is no requirement to regularly maintain the pre-filtration unit 202. The storage tank unit 204 comprises a refrigeration unit 205 in order to bring the shower water to the desired temperature in the storage tank.

When the water has been brought to the desired temperature in the storage tank 204, the water is conveyed, by way of a pump 207 and a valve 208, to a filtration unit 109 that can be a membrane unit 109. The membrane unit 109 can comprise a microfiltration unit or an ultrafiltration unit that can comprise one or several membrane modules 224. If more than one membrane module 224 is present, the modules 224 can be connected either in parallel or in series and in combination, as is diagrammatically shown in FIG. 2. The flow through the membrane module can take place in a cross-flow method or in a dead-end method. These two methods are described in more detail in FIG. 3.

By way of a further valve 210 the water is channeled from the filtration unit 109 to an after-treatment unit 211, and subsequently to a disinfection unit 212. These two units can be arranged either together in a module 240 or separately. The after-treatment methods can be chemical and/or physical absorption methods.

The disinfection unit 212 can be fed with the use of external disinfectant addition 217. In this arrangement the supply of the external disinfectant 217 takes place by way of a backwash valve 118 that can be implemented as a three-way valve and that is connected to the disinfection unit 212 as well as to a first backwash line 119 and a freshwater feed unit 122. The used shower water, cleansed of solids, organic impurities, and after inhibition of bacteria and viruses, reaches the connected control unit 125 and subsequently again by way of the heater unit 222 to the recirculation shower 113, where it is made available for showering. After the water has reached the shower tray 201 it commences a new cycle. When the showering process is completed, the water is fed to the exterior atmosphere, by way of an air check valve 206 that is connected to the storage tank unit 204, either by way of a drain mast to the exterior atmosphere, or into a separate container for subsequent disposal.

To make it possible to remove layers on the filtration unit 109 that is designed as a membrane unit 109, and in order to be able to render the filtration unit 109 useable in the longer term, backwashing is provided. Backwashing can be triggered by means of a detection unit 123, which is connected to the filtration unit 109 by way of a line 136.

The detection unit 123 may be designed as a pressure sensor 123 that determines a first pressure P1 by way of a line 139 upstream of the filtration unit 109, and a second pressure P2 of the used shower water by way of a line 138 downstream of the filtration unit 109. The pressure sensor 123 can determine a differential pressure from the first pressure P1 and the second pressure P2. The pressure sensor 123 is designed to trigger backwashing when a threshold value of the differential pressure has been reached or when there is a loss of volume flow through the filtration unit 109. Preferably, for reasons associated with comfort, backwashing is operated in a time-controlled or use-controlled manner. In this arrangement, backwashing can be triggered after a particular number of uses, wherein the backwash valve 118 and the first valve 208 and the shut-off valve 215 can be closed, and the backwash valve 118 can be moved to a backwash position. The water is then, in short pulses or evenly for a particular period of time, conveyed to a first backwash line 119 that connects the freshwater feed unit 122 by way of the freshwater shut-off valve 116, the nonreturn valve 214 as well as the backwash valve 118 to the filtration unit 109, and in this way makes it possible for backwashing of the filtration unit 109, which is designed as a membrane unit 109, to take place. In this arrangement, for example, layers or residues on the membrane unit 109 are removed from said membrane unit 109 by means of water and are carried along by the backwash water. The backwash water is conveyed to the storage tank unit 204 by way of a second backwash line 121, wherein after completion of the backwash process said backwash water can be drained by way of an air check valve 206.

In addition to optimizing the service life of the membrane by means of backwashing, the entire setup or the entire system 100 can be cleaned and rinsed. This can take place after each user or after a defined period of time. To this effect, again, in a showering process freshwater is conveyed, by way of the freshwater shut-off valve 116, the nonreturn valve 214 and the shut-off valve 115, to the circuit or to the system 100. In this arrangement the freshwater is conveyed directly from the filtration unit 109, by way of line 241 (which is shown as a dashed line), to the storage tank unit 204, wherein cleaning agents are added to the water. Analogous to a showering process, the water is then circulated in order to clean the pipelines and the devices present in the system 100 and subsequently to rinse them. In this arrangement the after-treatment unit 211 or the disinfection unit 212 can be removed as separate units and can be cleaned separately. The simple manner of installing and deinstalling these assemblies makes it possible, for example, to provide each passenger with a treatment cartridge of his/her own, which treatment cartridge can be changed after each showering process. This obviates the need for thorough cleaning after use of the shower unit by a passenger. The use of treatment cartridges can furthermore reduce the danger of contaminating the shower system.

It may also be possible for the system 100 to be designed so that it can feed in parallel freshwater or used purified shower water to several shower cabins. This provides an advantage in that the shower system 100 can be installed in a compact space and in that shower regions located nearby can be operated jointly.

All the components may be adapted to the requirements on board the aircraft so that said components can be integrated and can match all the electrical and mechanical interfaces and requirements of the aircraft.

Figure 3:
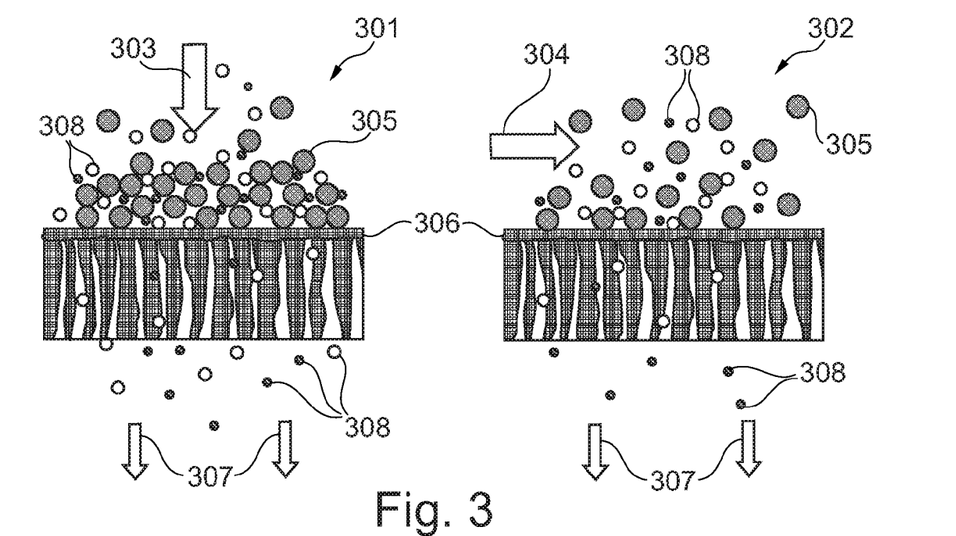
FIG. 3 shows a diagrammatic view of two options of fluid flow through membrane modules in the system for water purification for a recirculation shower in a means of transport according to an exemplary embodiment of the invention.

FIG. 3 shows a membrane module 301 that is designed for dead-end operation, and a membrane module 302 that is designed for cross-flow operation.

In dead-end operation of the membrane module 301 the used shower water with dirt particles of different sizes 305, 308 is channeled onto the membrane surface 306 in a direction 303 so as to be perpendicular to the membrane surface 306. During the process of moving through the membrane 306 the large particles 305 are sorted and get caught in the membrane 306, i.e. they deposit as a layer on the membrane 306, wherein the particles of a smaller diameter 308 pass through the membrane 306 and, after filtering, flow in a direction 307 vertically to the membrane surface 306.

In cross-flow operation with the membrane module 302 the used shower water with particles of different sizes 305, 308 flows horizontally 304 to the membrane surface 306. In this arrangement, large particles 305 lodge on the pre-filter side of the membrane 306, which large particles 305 are filtered by the membrane 306, wherein the shower water with smaller particles 308 flows in vertical direction 307 to the membrane surface 306 through the membrane 306 and onwards after the filtration process.

In this arrangement the material of the membrane 306 can be organic or inorganic. The arrangement of the membrane 306 in the module can be designed as a tubular membrane or a flat membrane.

Figure 4:
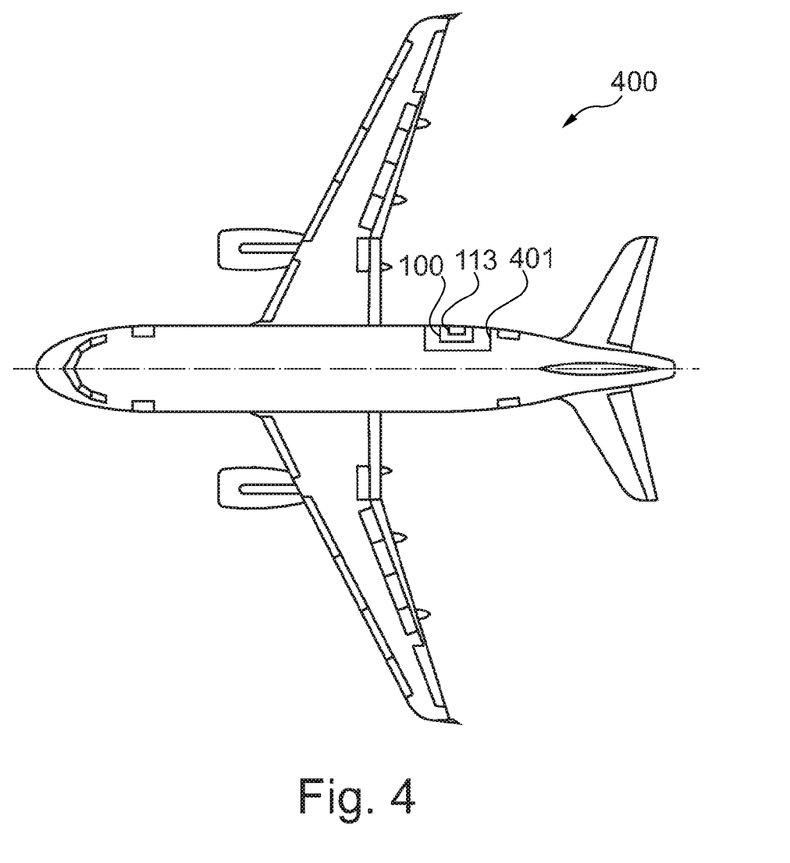
FIG. 4 shows a diagrammatic view of a means of transport with a monument with a recirculation shower according to an exemplary embodiment of the invention.

FIG. 4 shows a diagrammatic view of a means of transport 400, in particular of an aircraft 400 with a monument 401 that comprises a recirculation shower system 100 with a shower 113.

Figure 5:
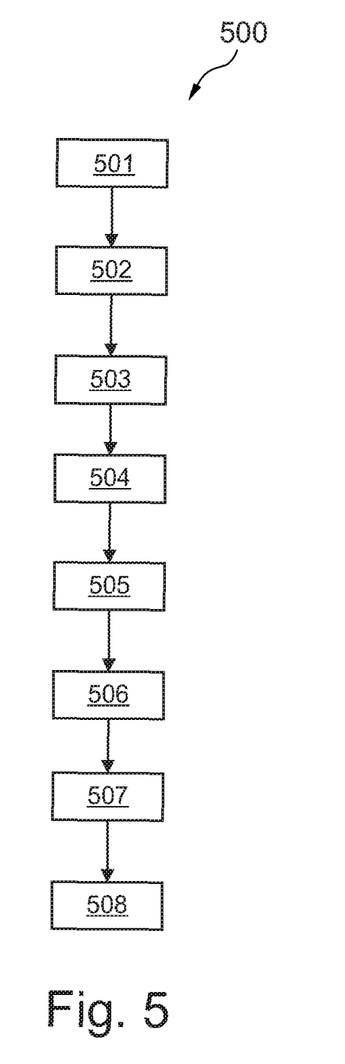
FIG. 5 shows a flow chart of a method for water purification for a recirculation shower in a means of transport according to an exemplary embodiment of the invention.

FIG. 5 shows a flow chart of a method 500 for water purification for a recirculation shower 113 in a means of transport.

The method 500 comprises the following steps: in step 501 filtering of used shower water by means of a filtration unit takes place. In step 502 backwash water is conveyed to the filtration unit by way of a first backwash line. In a further step 503 cleaning of the filtration unit by means of backwashing through the first backwash line and through a second backwash line takes place. In a fourth step 504 the backwash water is discharged from the filtration unit by means of the second backwash line. In a further step 505 feeding freshwater for supplying water to the recirculation shower and for feeding backwash water for backwashing by means of a freshwater feed unit takes place. In a next step 506 controlling or regulating the water supply through the freshwater feed unit takes place by means of the control unit. In a seventh step 507 determining a malfunction of the filtration unit by means of a detection unit takes place. In a last step 508 triggering backwashing based on the malfunction of the filtration unit takes place by means of the detection unit.

Figure 6:
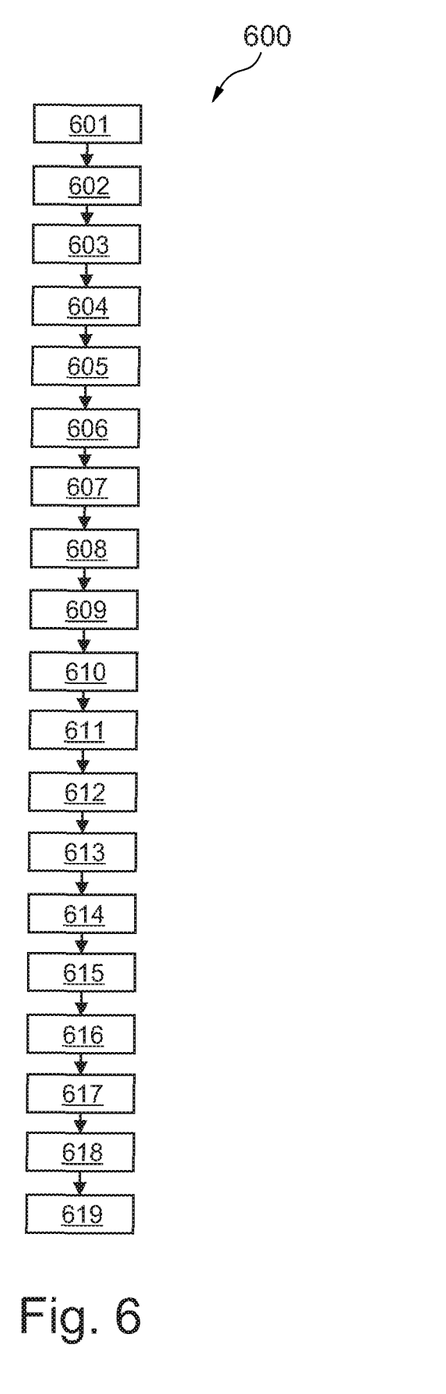
FIG. 6 shows a flow chart of a method for water purification for a recirculation shower in a means of transport according to a further exemplary embodiment of the invention.

FIG. 6 shows a flow chart of a method 600 for water purification for a recirculation shower in a means of transport. The method 600 comprises the following steps: in step 601 first filtering of the shower water of the recirculation shower by means of a pre-filtration unit takes place. In step 602 bringing about a determined temperature of the shower water after first filtering by means of a storage tank unit takes place. In step 603 pumping the shower water from the storage tank unit by way of a first valve to a filtration unit by means of a pump takes place. In step 604 second filtering of the shower water through the filtration unit takes place. In step 605 conveying the shower water by way of a second valve from the filtration unit to an after-treatment unit takes place. In step 606 after-treatment of the shower water by means of the after-treatment unit takes place. In step 607 carrying out backwashing for cleaning the filtration unit takes place. In step 608 feeding freshwater to the system and feeding backwash water for backwashing by means of a freshwater feed unit takes place. In step 609 blocking the freshwater feed to the system takes place if backwashing has been triggered, by means of a shut-off valve. In step 610 setting a backwash position during backwashing by means of a backwash valve takes place. In step 611 conveying the backwash water conveyed through the backwash valve to the filtration unit by means of a first backwash line takes place. In step 612 conveying the backwash water from the filtration unit to the storage tank unit by means of a second backwash line takes place. In step 613 draining the backwash water to the exterior atmosphere of the means of transport or to a container of the means of transport after backwashing takes place by means of an air check valve. In step 614 preventing contamination of the freshwater feed unit by means of a nonreturn valve and a freshwater shut-off valve takes place. In step 615 cleaning the pre-filtration unit by means of vacuum suction takes place. In step 616 bringing about a desired shower water temperature by means of a heating unit takes place. In step 617 delivering the shower water through a shower head takes place. In step 681 receiving the used shower water by means of a shower tray takes place. Finally, in step 619, which is the last step, backwashing the filtration unit after a determined number of showering processes takes place.

Although the invention was described with reference to the exemplary embodiments, various changes and modifications can be carried out without leaving the scope of protection of the invention. The means of transport with the monument, which means of transport comprises a recirculation shower with a system for water purification for the recirculation shower, can be designed as a land vehicle, an aero plane or helicopter, a water vehicle or a rail vehicle.

In addition, it should be pointed out that "comprising" does not exclude other elements or steps, and "a" or "an" does not exclude a plural number. In particular, the system can, for example, also comprise more than one filtration unit, more than one first backwash line, more than one second backwash line, more than one freshwater feed unit, more than one control unit, more than one detection unit, more than one disinfection unit, more than one backwash valve, more than one pre-filtration unit, more than one storage tank unit, more than one after-treatment unit, more than one nonreturn valve, more than one freshwater shut-off valve, more than one refrigeration unit, more than one shut-off valve, more than one pump, more than one first valve, more than one second valve, more than one air check valve, more than one vacuum suction device, more than one shower head, more than one shower tray and more than one heater unit; the recirculation shower can comprise more than one system for water purification; and the means of transport can comprise more than one monument and more than one recirculation shower.

Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

Moreover, while at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A system for water purification for a recirculation shower in an aircraft, with the system comprising:
 a filtration unit adapted to filter a used shower water;
 a first backwash line that is adapted to clear the filtration unit with backwashing and convey backwash water to the filtration unit;
 a second backwash line adapted to clear the filtration unit with backwashing and discharge backwash water from the filtration unit, the second backwash line in communication with a storage tank; and
 an air check valve in communication with the storage tank that drains the backwash water to an exterior atmosphere surrounding the aircraft or to a container of the aircraft after backwashing.

2. The system of claim 1, wherein the filtration unit is a microfiltration unit, and the filtration unit is separate from the storage tank.

3. The system of claim 1, wherein the filtration unit is an ultrafiltration unit.

4. The system of claim 1, further comprising:
a freshwater feed unit that feeds freshwater to supply the recirculation shower with water and is in communication with the first backwash line to feed backwash water for backwashing; and
a control unit that is adapted to control the freshwater feed unit.

5. The system of claim 4, wherein the control unit is adapted to control water supply through the freshwater feed unit at least based partially on a shower water flow through the filtration unit.

6. The system of claim 4, wherein the control unit is designed as a control valve.

7. The system of claim 4, further comprising:
a nonreturn valve that is adapted to prevent dirt build-up on the freshwater feed unit;
a freshwater shut-off valve that is adapted to the prevent dirt build-up on the freshwater feed unit; and
a shut-off valve that is adapted to block freshwater feed to the system if backwashing is triggered.

8. The system of claim 1, further comprising:
a detection unit that is adapted to determine a malfunction in the filtration unit and trigger backwashing based at least partially on the malfunction of the filtration unit.

9. A system of claim 8, wherein the detection unit is designed as a pressure sensor and adapted to determine a differential pressure from a first pressure (p1) upstream of the filtration unit and a second pressure (p2) downstream of the filtration unit;
wherein the pressure sensor is adapted to trigger backwashing when a threshold value has been reached.

10. The system of claim 9, wherein the threshold value is a threshold value of the differential pressure.

11. The system of claim 9, wherein the threshold value is a threshold value of a loss of volume flow in the filtration unit determined from the differential pressure.

12. The system of claim 1, further comprising:
a backwash valve that is designed as a three-way valve and adapted to set a backwash position during backwashing; and
a disinfection unit that disinfects the shower water after filtration of the shower water through the filtration unit, receives a disinfectant by way of the backwash valve, and disinfects the shower water with the disinfectant.

13. The system of claim 1, further comprising:
a pre-filtration unit that is adapted for first filtration of the shower water of the recirculation shower; and
an after-treatment unit is adapted for after-treatment of the shower water,
wherein the storage tank includes a refrigeration unit to bring about a particular temperature of the shower water after the first filtration and is adapted to hold a cleaning agent for use in backwashing the system.

14. The system of claim 1 further comprising:
a refrigeration unit that is adapted to bring about a particular temperature of the used shower water prior to filtering the shower water by the filtration unit
wherein the refrigeration unit in communication with the storage tank.

15. A transport; comprising:
a monument that comprises a recirculation shower,
a system for water purification for the recirculation shower, the system comprising:
a filtration unit adapted to filter a used shower water;
a first backwash line that is adapted to clear the filtration unit with backwashing and conveys backwash water to the filtration unit;
a second backwash line adapted to clear the filtration unit with backwashing and discharge backwash water from the filtration unit, the second backwash line in communication with a storage tank; and
an air check valve in communication with the storage tank that drains the backwash water to an exterior atmosphere of the transport or to a container of the transport after backwashing.

16. The transport of claim 15, wherein the transport is an aero plane.

17. A method for water purification for a recirculation shower in an aircraft, the method comprising:
filtering used shower water through a filtration unit;
conveying backwash water to the filtration unit through a first backwash line;
cleaning the filtration unit by backwashing through the first backwash line and through a second backwash line;
discharging backwash water from the filtration unit through the second backwash line into a storage tank; and
draining the backwash water from the storage tank via an air check valve to an exterior atmosphere surrounding the aircraft or to a container of the aircraft after backwashing.

18. The method of claim 17, further comprising:
feeding freshwater for supply of water to the recirculation shower;
feeding backwash water for backwashing through a freshwater feed unit; and
controlling water supply through the freshwater feed unit by a control unit.

19. The method of claim 18, further comprising:
determining a malfunction of the filtration unit with a detection unit; and
triggering backwashing based at least in part on the malfunction of the filtration unit with the detection unit.

* * * * *

UNITED STATES PATENT AND TRADEMARK OFFICE
CERTIFICATE OF CORRECTION

PATENT NO.        : 8,501,013 B2                           Page 1 of 1
APPLICATION NO.   : 12/726104
DATED             : August 6, 2013
INVENTOR(S)       : Simone Guttau et al.

It is certified that error appears in the above-identified patent and that said Letters Patent is hereby corrected as shown below:

In the Claims

Column 14, Claim 14, line 6: insert --,-- after --unit--

Signed and Sealed this
Thirty-first Day of December, 2013

Margaret A. Focarino
*Commissioner for Patents of the United States Patent and Trademark Office*